US008972573B2

(12) United States Patent
Piemonte et al.

(10) Patent No.: US 8,972,573 B2
(45) Date of Patent: Mar. 3, 2015

(54) TRIGGERING ACTIONS BASED ON CHANGES IN A NETWORK CONNECTION

(71) Applicant: Apple Inc., Cupertino, CA (US)

(72) Inventors: Patrick S. Piemonte, San Francisco, CA (US); Augustin Prats, Mountain View, CA (US)

(*) Notice: Subject to any disclaimer, the term of this patent is extended or adjusted under 35 U.S.C. 154(b) by 0 days.

(21) Appl. No.: 14/021,902

(22) Filed: Sep. 9, 2013

(65) Prior Publication Data

US 2014/0082181 A1 Mar. 20, 2014

Related U.S. Application Data

(63) Continuation of application No. 12/581,004, filed on Oct. 16, 2009, now abandoned.

(51) Int. Cl.
*G06F 15/173* (2006.01)
*H04L 12/26* (2006.01)
*G06F 13/40* (2006.01)
*H04M 1/725* (2006.01)
*H04L 29/08* (2006.01)
*H04M 1/60* (2006.01)
*H04W 76/04* (2009.01)

(52) U.S. Cl.
CPC .......... *H04L 43/045* (2013.01); *G06F 13/4068* (2013.01); *H04M 1/72569* (2013.01); *H04M 1/72597* (2013.01); *H04L 67/18* (2013.01); *H04M 1/6091* (2013.01); *H04M 1/7253* (2013.01); *H04M 1/72572* (2013.01); *H04M 2250/10* (2013.01); *H04M 2250/12* (2013.01); *H04W 76/046* (2013.01)
USPC ....................................................... 709/224

(58) Field of Classification Search
None
See application file for complete search history.

(56) References Cited

U.S. PATENT DOCUMENTS

| 6,246,376 | B1 | 6/2001 | Bork |
| 6,347,278 | B2 * | 2/2002 | Ito .................................. 701/411 |
| 6,381,535 | B1 * | 4/2002 | Durocher et al. ............. 701/423 |
| 6,463,298 | B1 * | 10/2002 | Sorenson et al. .......... 455/552.1 |
| 6,470,464 | B2 | 10/2002 | Bertram et al. |
| 6,513,120 | B2 | 1/2003 | Kanzawa et al. |
| 6,725,285 | B2 | 4/2004 | Van De Meulenhof et al. |
| 7,020,881 | B2 | 3/2006 | Takahashi et al. |
| 7,024,192 | B2 | 4/2006 | Aoki et al. |
| 7,103,337 | B2 | 9/2006 | Uozumi et al. |
| 7,136,645 | B2 | 11/2006 | Hanson et al. |
| 7,155,518 | B2 | 12/2006 | Forslow |
| 7,158,811 | B2 | 1/2007 | Jin |

(Continued)

OTHER PUBLICATIONS

Garmin, "Garmin's nuvi 900T: Combo Mobile TV, Navigation Device for Italy", pp. 1-3, Mar. 6, 2008, http://www.ibszone.com/content/view/3038/2/, downloaded Jun. 8, 2009.

(Continued)

*Primary Examiner* — Ninos Donabed
(74) *Attorney, Agent, or Firm* — Park, Vaughan, Fleming & Dowler LLP; Anthony P. Jones

(57) ABSTRACT

The described embodiments provide a system for performing an action based on a change in a status of a wired or wireless network connection for the system. During operation, the system detects the change in the status of the network connection. In response to detecting the change, the system determines a state of the system. The system then performs one or more actions using the determined state.

17 Claims, 6 Drawing Sheets

(56) References Cited

U.S. PATENT DOCUMENTS

| | | |
|---|---|---|
| 7,174,144 B2 | 2/2007 | Lin |
| 7,197,562 B2 | 3/2007 | Murtha et al. |
| 7,209,742 B2 * | 4/2007 | Alberth et al. ............. 455/435.2 |
| 7,260,835 B2 | 8/2007 | Bajikar |
| 7,263,340 B2 | 8/2007 | Uozumi et al. |
| 7,336,929 B2 | 2/2008 | Yasuda et al. |
| 7,387,607 B2 | 6/2008 | Holt et al. |
| 7,483,989 B2 | 1/2009 | Williams et al. |
| 7,523,212 B2 | 4/2009 | Woolf et al. |
| 7,574,208 B2 | 8/2009 | Hanson et al. |
| 7,668,556 B2 | 2/2010 | Yokoshi et al. |
| 7,706,772 B2 | 4/2010 | Malcolm |
| 8,060,656 B2 | 11/2011 | Hanson et al. |
| 8,078,727 B2 | 12/2011 | Hanson et al. |
| 8,266,296 B2 | 9/2012 | Dowling et al. |
| 8,467,326 B2 | 6/2013 | Deprun |
| 8,601,127 B2 | 12/2013 | Lim et al. |
| 2002/0171546 A1 * | 11/2002 | Evans et al. .................... 340/540 |
| 2002/0187804 A1 * | 12/2002 | Narasimha et al. ............ 455/552 |
| 2003/0151478 A1 * | 8/2003 | Radosavljevic et al. ........ 335/18 |
| 2004/0192304 A1 * | 9/2004 | Casaccia et al. ........... 455/435.1 |
| 2005/0033511 A1 * | 2/2005 | Pechatnikov et al. ......... 701/210 |
| 2007/0135091 A1 | 6/2007 | Wassingbo |
| 2007/0275709 A1 | 11/2007 | Lei |
| 2008/0100706 A1 | 5/2008 | Breed |
| 2009/0207014 A1 * | 8/2009 | Ayed ........................ 340/539.13 |
| 2010/0022217 A1 | 1/2010 | Ketari |
| 2014/0028477 A1 * | 1/2014 | Michalske .................... 340/990 |

OTHER PUBLICATIONS

Thongthammachart, Saowanee et al., "Bluetooth Enables In-door Mobile Location Services", pp. 2023-2027, 2003 IEE Xplore.

"G-Park Simple Parking Application for the iPhone", Posimotion, pp. 1 of 1, downloaded Jun. 8, 2009 from http://www.posimotion.com/index.php?argv=gpark.

* cited by examiner

TRIGGERING ACTIONS BASED ON CHANGES IN A NETWORK CONNECTION

RELATED APPLICATION

The instant application is a continuation of, and hereby claims priority under 35 U.S.C. §120 to, pending U.S. patent application Ser. No. 12/581,004, which is titled "Triggering Actions Based on Changes in a Network Connection," by inventors Patrick Piemonte and Augustin Prats, which was filed on 16 Oct. 2009, and which is incorporated by reference.

BACKGROUND

1. Field

The described embodiments relate to techniques for improving the performance of electronic devices. More specifically, the described embodiments relate to a method and apparatus for triggering actions based on changes in a network connection for an electronic device.

2. Related Art

Designers have continually increased the number of features which are available in portable electronic devices such as smart phones, laptops, and netbooks. Consequently, despite their being relatively small, many of today's portable electronic devices provide many of the features of desktop computers from just a few years ago, yet also provide additional features that are unique to portable electronic devices. For example, many portable electronic devices provide network connectivity (e.g., Bluetooth™ (from the Bluetooth SIG, Inc. of Bellevue, Wash., USA), WiFi, 3G/4G networks, USB, Ethernet, etc.), full-featured Internet browsers, location-sensing services (e.g., global positioning systems, etc.), still and video cameras, media players, pressure/temperature/direction sensors, and many other features. These features enable portable devices to provide a number of different services, including email, phone, text messaging, instant messaging, communicating on social networks, location-based services such as travel route planning, Internet browsing, playing back media, and many others.

Unfortunately, because this large number of features has only recently become available in portable electronic devices, designers have not yet taken advantage of many of the functions that could be performed using combinations of features in the devices.

SUMMARY

The described embodiments provide a system (e.g., system 100) for performing an action based on a change in a status of a wired or wireless network connection for the system. During operation, the system detects the change in the status of the network connection. In response to detecting the change, the system determines a state of the system. The system then performs one or more actions using the determined state.

In some embodiments, when detecting the change in status of the network connection, the system detects at least one of: (1) a disconnection from or a reconnection to the network connection; (2) a change in a signal strength of the network connection; (3) a change in a bandwidth of the network connection; or (4) the ability or inability to communicate with a predetermined second system on the network connection.

In some embodiments, when determining the state of the system, the system requests one or more subsystems in the system to return information about the state of the system. In response to the request, the system receives information about the state of the system from the subsystems. The system then records the information about the state of the system.

In some embodiments, when requesting the one or more subsystems to return information about the state of the system, the system requests the one or more subsystems to return information about one or more of a past, current, or projected future state of the system.

In some embodiments, the state of the system includes an internal state of the system. In these embodiments, the requested information includes information sampled from at least one of internal hardware or software monitors in the system.

In some embodiments, the state of the system includes an external state of the system. In these embodiments, the requested information includes information sampled by one or more sensors in the system about at least one of: (1) a geographical or physical location of the system; (2) a linear or angular velocity or acceleration of the system; (3) a directional heading of the system; (4) a temperature external to the system; (5) a tilt or rotation of the system; (6) an atmospheric pressure external to the system; (7) an intensity of light external to the system; (8) a level of sound external to the system; or (9) a time.

In some embodiments, when returning information about a projected future state of the system, the system acquires one or more current or prior samples of information about a state of the system. The system then generates a projected future state of the system from the acquired samples.

In some embodiments, recording the information includes storing the information in at least one of a volatile memory or a non-volatile memory.

In some embodiments, when performing the action using the determined state, the system is configured to cause one or more subsystems in the system or one or more applications in the system to perform one or more operations using the determined state.

In some embodiments, when performing the action using the determined state, the system is configured to cause one or more other systems or one or more applications in the other systems to perform one or more operations using the determined state.

In some embodiments, the system is configured to wait a predetermined time before determining the state of the system.

In some embodiments, the system is configured to wait a predetermined time before performing at least one of the one or more actions.

BRIEF DESCRIPTION OF THE FIGURES

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. For example, in some embodiments the computer-readable storage medium can include, but is not limited to, volatile memory (e.g., synchronous dynamic random access memory (SDRAM)/double data-rate synchronous dynamic random access memory (DDR SDRAM), dynamic random access memory (DRAM), etc.), non-volatile memory (e.g., flash memory, solid-state drives, etc.), magnetic and optical storage devices such as disk drives, magnetic tape, CDs (compact discs), DVDs (digital versatile discs or digital video discs), or other media capable of storing code and/or data.

The methods and processes herein described can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes herein described can be included in hardware modules. For example, the hardware modules can include, but are not limited to, application-specific integrated circuit (ASIC) chips, field-programmable gate arrays (FPGAs), and other programmable-logic devices. When the hardware modules are activated, the hardware modules perform the methods and processes included within the hardware modules.

System

Figure 1:
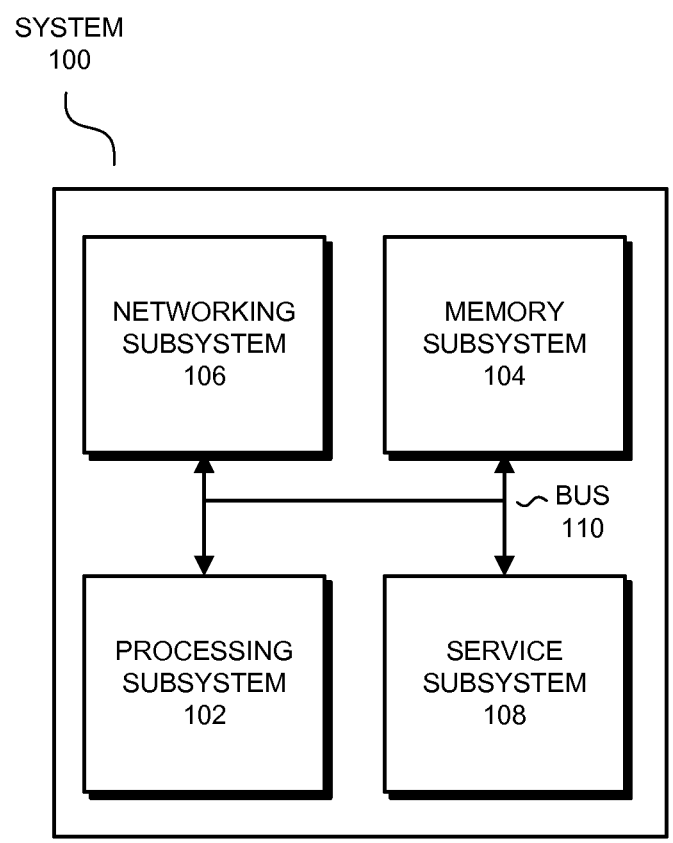
FIG. 1 presents a block diagram of a system in accordance with the described embodiments.

FIG. 1 presents a block diagram of system 100 in accordance with the described embodiments. System 100 includes processing subsystem 102, memory subsystem 104, networking subsystem 106, and service subsystem 108.

Processing subsystem 102 can include one or more devices configured to perform computational operations. For example, processing subsystem 102 can include, but is not limited to, one or more microprocessors, ASICs, microcontrollers, or programmable-logic devices.

Memory subsystem 104 can include one or more devices for storing data and/or instructions for processing subsystem 102, networking subsystem 106, and/or service subsystem 108. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for system 100.

In some embodiments, memory subsystem 104 is coupled to one or more high-capacity mass-storage devices (not shown). For example, memory subsystem can be coupled to a magnetic or optical drive, a solid-state drive, or another type of mass-storage device. In these embodiments, memory subsystem 104 can be used by system 100 as fast-access storage for often-used data, while the mass-storage device is used to store less frequently used data.

Networking subsystem 106 can include one or more devices configured to couple to and communicate on a wired and/or wireless network (i.e., to perform network operations). For example, networking subsystem 106 can include, but is not limited to, a Bluetooth™ networking system, a cellular networking system (e.g., a 3G/4G network), a universal serial bus (USB) networking system, a networking system based on the standards described in Institute for Electrical and Electronic Engineers (IEEE) 802.11 (interchangeably called "an 802.11 network"), an Ethernet networking system, or a wired or wireless personal-area networking (PAN) system (e.g., an infrared data association (IrDA), ultra-wideband (UWB), Z-Wave, or a network based on the standards described in IEEE 802.15). In some embodiments, networking subsystem 106 can include one or more hard-wired electrical connections (e.g., a 30-pin connector) that can be used for networking (and possibly for other purposes, such as providing external power to system 100).

Networking subsystem 106 can include controllers, radios/antennas, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad hoc network connection (e.g., an ad-hoc wireless PAN) with other devices.

Service subsystem 108 can include any device configured to perform one or more services within system 100. Generally, service subsystem 108 includes one or more functional blocks, components, circuits, elements, transducers, monitors, and/or sensors that can be used to perform the services. (Note that, although in the following paragraphs we describe several services that can be provided by service subsystem 108, in alternative embodiments, service subsystem 108 can provide more and/or different services.)

For example, service subsystem 108 can include one or more location-sensing systems. The location-sensing systems can include, but are not limited to, global positioning systems (GPS), cellular-phone-system-based location systems (e.g., cell-identification (cell-ID), cell-ID++, enhanced observable time difference (E-OTD), and/or 3G positioning), and/or WiFi position systems for determining a geographical location of system 100. In embodiments where service subsystem 108 includes two or more location-sensing systems, the location-sensing systems can be used separately, or can be used in combination to sense a location of system 100.

As another example, service subsystem 108 can include one or more sensing systems, each coupled to one or more sensors for sensing external and/or internal conditions for tracking a current, past, or projected future state for system 100 (i.e., for processing subsystem 102, memory subsystem 104, networking subsystem 106, and/or service subsystem 108 within system 100). For example, service subsystem 108 can include sensors such as accelerometers, compasses, tilt/ rotation detectors, thermometers, ambient light sensors, atmospheric pressure sensors (barometers), cameras, microphones, and/or timers/clocks.

As yet another example, service subsystem 108 can include one or more monitoring systems coupled to internal hardware and/or software monitors for tracking a current, past, or projected future state for system 100. For example, service subsystem 108 can include, but is not limited to, monitors for tracking processing subsystem 102's workload, temperature, application profile (i.e., what applications are executing on processing subsystem 102), and/or I/O activity. As another example, service subsystem 108 can include, but is not limited to, monitors for tracking the networks available to networking subsystem 106, or networking subsystem 106's connectivity and/or bandwidth usage.

As still another example, service subsystem 108 can include one or more logging services for logging a state of system 100. In some embodiments, each logging service can be configured to record events and data from one or more of the services provided by service subsystem 108. For example, assuming that service subsystem 108 includes a location-sensing system, the logging service can be configured to capture location information from the location-sensing system and log the information. In some embodiments, the service subsystem 108 can be configured to store the logged state in memory subsystem 104 (including storing the logged state in non-volatile storage, so that the state is maintained if a power supply for system 100 is turned off or lost).

In the embodiments that track a projected future state for system 100, service subsystem 108 can automatically sample a state of system 100 at a predetermined interval. Service subsystem 108 can then project a future state for system 100 based on a predetermined number of prior samples. For example, if a temperature of system 100 has been 75° F. over a prior 12 samples at 10-minute intervals, service subsystem 108 can project that the temperature of system 100 will remain 75° for a next sample.

Within system 100, processing subsystem 102, memory subsystem 104, networking subsystem 106, and service subsystem 108 are coupled together using bus 110. Bus 110 is an electrical connection between the subsystems that the separate subsystems can use to communicate commands and data among one another. Note that, although we show only one bus 110 for clarity, different embodiments can include a different number or configuration of electrical connections between the subsystems.

In some embodiments, bus 110 is a packet bus and communication among the subsystems involves sending command and data packets in predetermined formats on bus 110. In alternative embodiments, bus 110 includes one or more dedicated signal lines and communication between the subsystems involves signaling the subsystems on the one or more dedicated signal lines.

Although shown as separate subsystems in FIG. 1, in some embodiments, some or all of a given subsystem can be integrated into one or more of the other subsystems in system 100. For example, in some embodiments, service subsystem 108 can be partially integrated into processing subsystem 102, networking subsystem 106, and/or memory subsystem 104. In other words, in these embodiments, each of the subsystems may contain functional block(s), circuits, etc., for performing some or all of one or more services. Although alternative embodiments can be configured in this way, for clarity we describe embodiments where each of the subsystems is separate from the other subsystems.

System 100 can be incorporated into many different types of electronic devices. Generally, these electronic devices include any device that can perform an action based on a change in a network status. For example, system 100 can be part of a desktop computer, a laptop computer, a server, a media player, an appliance, a subnotebook/netbook, a cellular phone, a piece of testing equipment, a network appliance, a personal digital assistant (PDA), a smart phone, a toy, a controller, or another device.

Although we use specific components to describe system 100, in alternative embodiments, different components and/or subsystems may be present in system 100. For example, system 100 may include one or more additional processing subsystems 102, memory subsystems 104, networking subsystems 106, and/service subsystems 108. Alternatively, one or more of the subsystems may not be present in system 100.

In some embodiments, system 100 may include one or more additional subsystems that are not shown in FIG. 1. For example, system 100 can include, but is not limited to, a display subsystem for displaying information on an included display, a data collection subsystem for collecting data from an external system, an audio subsystem, an alarm subsystem, a media processing subsystem, and/or an input/output (I/O) subsystem to enable a user (or another system) to input data and commands into system 100 and to receive information from system 100.

Detecting a Status Chance for a Network Connection

Recall that in the described embodiments, networking subsystem 106 can include a Bluetooth™ networking system, a USB networking system, an 802.11 networking system, an Ethernet networking system, a wired or wireless PAN system, and/or another type of wired or wireless networking system. In the described embodiments, networking subsystem 106 uses well-known operations for a given network type to couple (i.e., connect) to the network, to send data on the network, and to uncouple (i.e., disconnect) from the network.

More specifically, in these embodiments, using events and/or signals associated with a given network type, networking subsystem 106 can detect when a change has occurred in a status of an associated network connection and send an event notification or signal to one or more of the other subsystems to indicate the change. For example, when a network connection is established, terminated, or lost, networking subsystem 106 can signal one or more of the other subsystems that the change has occurred.

In addition, in some embodiments, when a given network connection changes status in other predetermined ways, such as bandwidth availability, network provider, or signal strength, networking subsystem 106 can detect the change and signal one or more of the other subsystems that the status change has occurred. For example, if the bandwidth for a network connection transitions from full availability to restricted availability, networking subsystem 106 can detect the transition and signal the transition to the other subsystems. In addition, in some of these embodiments, networking subsystem 106 can detect an ability or inability to communicate with a particular other system on the network connection.

In some embodiments, networking subsystem 106 forwards event notifications or signals associated with status change for a given network type to the other subsystem(s) to signal the change in status. For example, assuming that networking subsystem 106 is coupled to a Bluetooth™ network, upon losing the Bluetooth™ network connection (e.g., upon moving too far from the Bluetooth™ network to remain coupled to the network), a Bluetooth™ disconnection event can be generated by networking subsystem 106 and forwarded to one or more of the other subsystems to signal that the Bluetooth™ connection was lost.

Recall also that in some embodiments networking subsystem 106 includes a hard-wired connection (e.g., a 30-pin connector or an Ethernet connection) that can be used for coupling to a network. In these embodiments, upon the hard-wired connection being disconnected or the signal on the hard-wired connection being lost, a signal can be generated from networking subsystem 106 to one or more of the other subsystems to indicate that the hard-wired connection is no longer functional. For example, assuming an embodiment where system 100 is coupled to a 30-pin connector, upon system 100 detecting that the 30-pin connector has lost power (e.g., has been disconnected or remains connected, but has lost electrical power), networking subsystem 106 can send a signal to notify one or more of the other subsystems of the power loss.

Performing an Action Based on a Network Status Change

The described embodiments can perform one or more actions based on a status change in a network connection. Generally, this can involve networking subsystem 106 detecting a change in the status of a given network connection and then sending a signal to one or more of the subsystems in system 100 to notify the subsystems of the status change. Upon receiving the signal indicating the status change of the network connection, one or more of the subsystems can perform the one or more actions. In some embodiments, performing the actions can involve recording information about a past, current, or predicted future state of system 100 and then using the recorded information to perform the one or more actions.

Note that in the following description, for clarity and brevity, we sometimes describe system 100 generally as performing network operations and actions. Although we describe the embodiments in this way, one or more of the subsystems shown in FIG. 1 can be performing some or all of the network operations and/or the actions.

Figure 2:
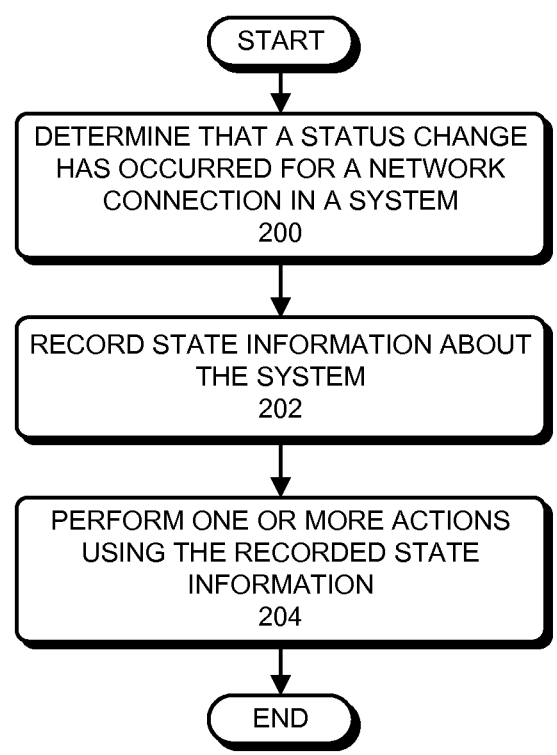
FIG. 2 presents a flowchart illustrating a process for performing an action based on a network status change in accordance with the described embodiments.

FIG. 2 presents a flowchart illustrating a process for performing an action based on a network status change in accordance with the described embodiments. The process starts when networking subsystem 106 in system 100 determines that a status change has occurred for a network connection (step 200). For example, assuming an embodiment where networking subsystem 106 includes one or more mechanisms for coupling to and communicating on a WiFi network and a Bluetooth™ network, and also includes a 30-pin hard-wired connector for coupling system 100 to a network, networking subsystem 106 can determine that a WiFi, Bluetooth™, or 30-pin connection has been established, lost, terminated, interrupted, has changed in signal strength a predetermined amount, or has otherwise changed in status.

Networking subsystem 106 then signals one or more of the subsystems in system 100 that the change in status for the network connection has occurred. For example, using the embodiment described with respect to step 200 (which we will use in describing all the operations in FIG. 2), networking subsystem 106 can signal a change in the status of the WiFi, Bluetooth™, or 30-pin connector to processing subsystem 102, memory subsystem 104, networking subsystem 106, and/or service subsystem 108.

Based on the received signal, one or more of the subsystems can record state information about system 100 (step 202). In the described embodiments the state information can include information about a past, current, or projected future internal and/or external state of system 100. The internal state information can include any state information regarding a state of system 100, including state information gathered from hardware or software monitors in system 100. The external state information can include any state information external to system 100, such as information gathered by one or more location-sensing devices, sensors, network devices, or transducers. In some embodiments, the information can include information received from other systems (i.e., systems external to system 100).

In the described embodiments, the recorded state information can be gathered by one of the subsystems from one or more of the other subsystems. For example, assuming that networking subsystem 106 signaled a WiFi, Bluetooth™, or 30-pin connector disconnect event to processing subsystem 102, processing subsystem 102 can query service subsystem 108 for information about an internal or external state of system 100. Moreover, processing subsystem 102 can query memory subsystem 104, networking subsystem 106, and/or internal structures in processing subsystem 102 for stored information about an internal or external state of system 100.

As described above, in some embodiments, the information can include information about a current, a prior, or a projected future state of system 100. In some embodiments, processing subsystem 102 can generate a projected future state of system 100 using a combination of recorded state information from memory subsystem 104 and current state information. In alternative embodiments, system 100 can use sampled state information to keep a projected future state available (i.e., in memory).

The subsystems then perform one or more actions using the recorded state information (step 204). For example, assuming an embodiment where networking subsystem 106 signals processing subsystem 102 upon detecting a WiFi, Bluetooth™, or 30-pin connector coupling event, processing subsystem 102 can request internal and/or external state information from service subsystem 108. Using the state information, processing subsystem 102 can then perform the one or more actions.

EXEMPLARY EMBODIMENTS

As described above, upon receiving a signal indicating a status change of a network connection, one or more of the subsystems can record information about a past, current, or predicted future state of system 100 and then can use the recorded information to perform the one or more actions. For example, assume an embodiment where system 100 is part of a smart phone in which service subsystem 108 includes one or more location-sensing systems (i.e., the smart phone is "location-aware"), and in which networking subsystem 106 supports a Bluetooth™ network connection. In this embodiment, upon losing a connection to a Bluetooth™ network (i.e., a "status change" in the Bluetooth™ network connection), networking subsystem 106 can signal processing subsystem 102 that the network connection has been lost. Processing subsystem 102 can then use external and/or internal state information from system 100 to perform an action associated with losing the Bluetooth™ network connection.

For example, in some of these embodiments, upon receiving notice of a change in network status, processing subsystem 102 can query service subsystem 108 for a current location of the smart phone. Upon receiving information about the location from service subsystem 108, processing subsystem 102 can record the location. Processing subsystem 102 can then use the recorded information for performing an action such as placing a pin on a map using a map application. For an embodiment where system 100 was coupled to a Bluetooth™ network in a car until the car was parked/turned off and the Bluetooth™ connection was lost, this embodiment can potentially assist a user in later finding the location where the car was parked, can send location information to roadside assistance, or can perform another operation.

Figure 3:
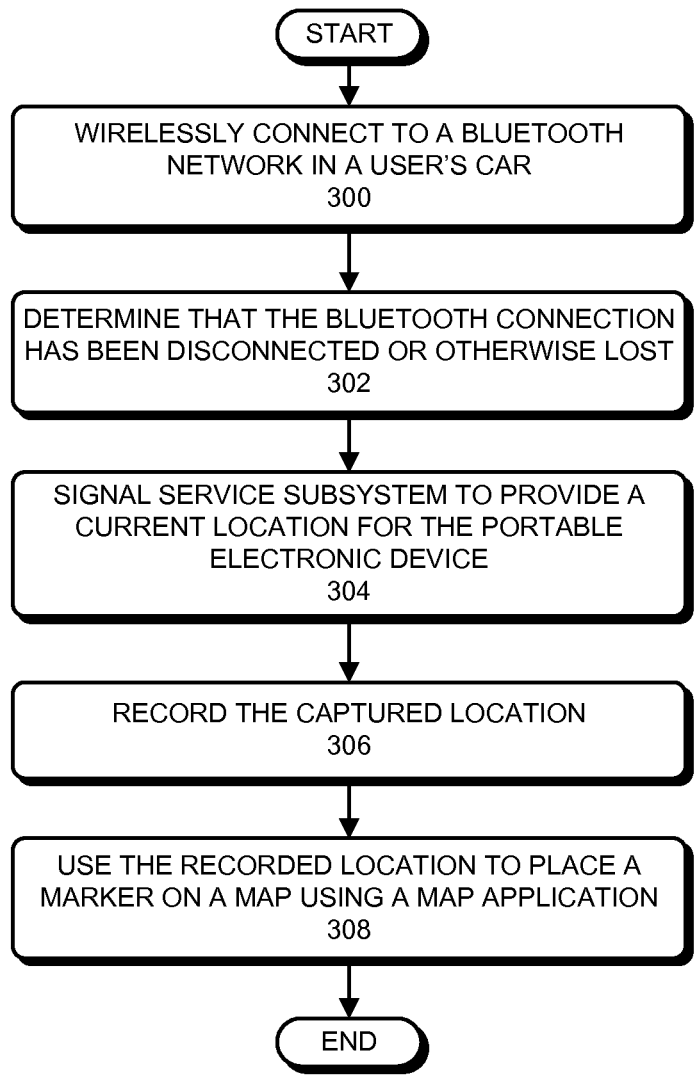
FIG. 3 presents a flowchart illustrating a process for using location information to perform an action based on a change in a status of a network connection in accordance with the described embodiments.

FIG. 3 presents a flowchart illustrating a process for using location information to perform an action based on a change in a status of a network connection in accordance with the described embodiments. For the example shown in FIG. 3, we assume a location-aware portable electronic device (e.g., a laptop, a smart phone, etc.) including a system 100 that wirelessly connects to a Bluetooth™ wireless network in a user's car.

As shown in FIG. 3, the process starts when the portable electronic device wirelessly connects to the Bluetooth™ network in the user's car (step 300). In some embodiments, a notification of the connection is passed from networking subsystem 106 to processing subsystem 102, and processing subsystem 102 begins to monitor the Bluetooth™ connection (i.e., the connection to the Bluetooth™ wireless network) for a disconnect event. In other embodiments, processing subsystem 102 does not monitor the Bluetooth™ connection, but instead detects disconnection events for the Bluetooth™ connection as they occur.

The portable electronic device then determines that the Bluetooth™ connection has been disconnected or otherwise lost (step 302). In some embodiments, networking subsystem 106 in the portable electronic device detects that the Bluetooth™ connection has been disconnected or otherwise lost. Upon detecting that the Bluetooth™ connection has been lost, networking subsystem 106 forwards a signal to processing subsystem 102 to notify processing subsystem 102 that the Bluetooth™ connection has been lost.

Processing subsystem 102 then sends a request to service subsystem 108 to provide a current location for the portable electronic device (step 304). In response, service subsystem 108 captures a current location of the portable electronic device using a GPS system, a position tracking system, or another location sensing mechanism. The captured location is then forwarded to processing subsystem 102 and recorded (step 306). Processing subsystem 102 then uses the recorded location information to place a pin on a map using a map application (step 308).

As another example, in some of these embodiments, upon receiving an indication from networking subsystem 106 that the Bluetooth™ connection has been lost, processing subsystem 102 can record the location where the connection was lost. The recorded information can be used to inform a user that he or she is leaving an area of the network (which can have been defined by the user or system 100 earlier). For an embodiment where system 100 was coupled to a Bluetooth™ network in a laptop, this can help to remind a user to secure the laptop before traveling too far from the laptop.

As yet another example, assume an embodiment where system 100 is part of a smart phone in which service subsystem 108 includes one or more location-sensing systems and one or more accelerometers, and in which networking subsystem 106 supports a Bluetooth™ network connection and a hard-wired connection (e.g., a 30-pin connection). In this embodiment, system 100 can detect that a hard-wired connection has lost power or that a Bluetooth™ network connection has been lost, and that a velocity at which system 100 was traveling has fallen from 65 mph to zero in a few seconds (using recorded current and prior state information for system 100). From this, system 100 can determine that a car accident may have occurred. System 100 can then perform actions such as sounding an alarm to a user that system 100 has determined that an accident may have happened to give the user a chance to cancel the action before system 100 alerts an outside party (e.g., a roadside assistance service or the authorities). In this embodiment, other information recorded about the state of system 100, such as time, traveling speed over a previous time interval, and/or location (i.e., on a highway) can be used to corroborate the determination.

Figure 4:
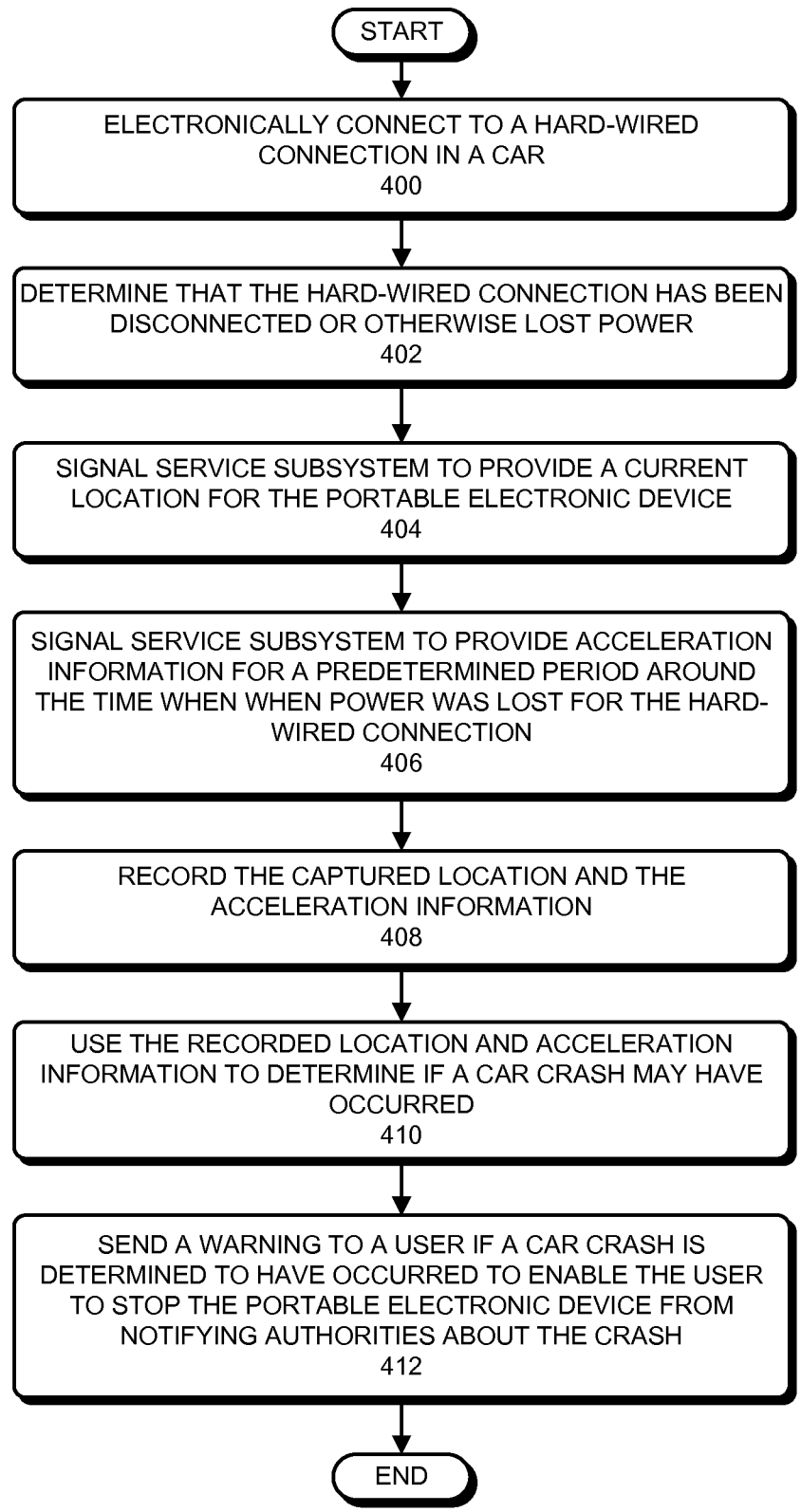
FIG. 4 presents a flowchart illustrating a process for using location information along with other information to perform an action based on a change in a status of a network connection in accordance with the described embodiments.

FIG. 4 presents a flowchart illustrating a process for using location information along with other information to perform an action based on a change in a status of a network connection in accordance with the described embodiments. For the example shown in FIG. 4, we assume a location-aware portable electronic device (e.g., a laptop, a smart phone, etc.) including a system 100 that electrically connects to a hard-wired connector in a user's car for recharging a battery in the electronic device and for networking.

As shown in FIG. 4, the process starts when the portable electronic device is electrically connected to the hard-wired connection in the user's car (step 400). In some embodiments, a notification of the connection is passed from networking subsystem 106 to processing subsystem 102, and processing subsystem 102 begins to monitor the hard-wired connection for a disconnect event. More specifically, processing subsystem 102 can monitor the delivery of electrical power through the hard-wired connection for possible losses of power. In other embodiments, processing subsystem 102 does not monitor the hard-wired connection, but instead detects losses of power for the hard-wired connection as they occur.

The portable electronic device then determines that the hard-wired connection has been disconnected or otherwise lost power (step 402). In some embodiments, networking subsystem 106 in the portable electronic device detects that the hard-wired connection has been disconnected or otherwise lost power. Upon detecting that the hard-wired connection has lost power, networking subsystem 106 forwards a signal to processing subsystem 102 to notify processing subsystem 102 that the hard-wired connection has lost power.

Processing subsystem 102 then signals service subsystem 108 to provide a current location for the portable electronic device (step 404). In response, service subsystem 108 captures a current location of the portable electronic device using a GPS system, a position tracking system, or another location sensing mechanism and forwards the location information to processing subsystem 102.

In addition, processing subsystem 102 signals service subsystem 108 to provide acceleration information for a predetermined time period around the time when the electrical connection for the hard-wired connection was lost (step 406). Note that these embodiments can periodically record acceleration and/or velocity and/or can detect acceleration or deceleration, including changes in velocity of greater than a predetermined amount in a given time (i.e., a change in velocity from 65 mph to 0 mph in less than 2 seconds). Providing the acceleration information can involve providing information about any deceleration for a short time before the loss of power until a short time after the loss of power. For example, 1-2 seconds before the loss of power to 1-2 seconds after the loss of power.

The captured location information and acceleration information is then recorded (step 408). Next, processing subsystem 102 determines if the recorded location information and acceleration information indicate that a car accident may have occurred (step 410). System 100 can then sound or display an alarm to a user that system 100 has determined that an accident may have happened to give the user a chance to cancel the action before system 100 alerts an outside party (e.g., a roadside assistance service or the authorities) (step 412). As described above, in this embodiment, other information recorded about the state of system 100, such as time, traveling speed over a previous time interval, and/or location (i.e., on a highway) can be used to corroborate the determination.

As a further example, assume an embodiment where system 100 is part of a netbook in which service subsystem 108 and/or processing subsystem 102 includes one or more mechanisms for providing location-sensing and personal contact management (i.e., phone/address contacts in memory subsystem 104), and that networking subsystem 106 includes one or more mechanisms for forming an ad hoc PAN with other nearby similarly equipped devices. In these embodiments, upon encountering another device that supports forming a PAN, networking subsystem 106 can form a PAN with the other device. Networking subsystem 106 can then signal processing subsystem 102 that the PAN has been formed. Processing subsystem 102 can then use information returned from one of the other subsystems (e.g., service subsystem 108 or memory subsystem 104) to perform associated actions. For example, processing subsystem 102 can upload or download predetermined information (i.e., public contact or identity information, schedule information, etc.) to or from the other device, can provide location-based information to the other device, or can perform another service.

In some embodiments, system 100 can perform further actions based on the identity of the user of a device with which the PAN is formed and/or based on the internal or external state of system 100 or the other device. For example, system 100 can determine that a PAN has been formed with another device and can retrieve public identity information from that device. If the device belongs to a known contact, system 100 can perform actions such as alerting the user to the presence of the person, turning down music, exchanging files intended for that person, or performing another operation.

Figure 5:
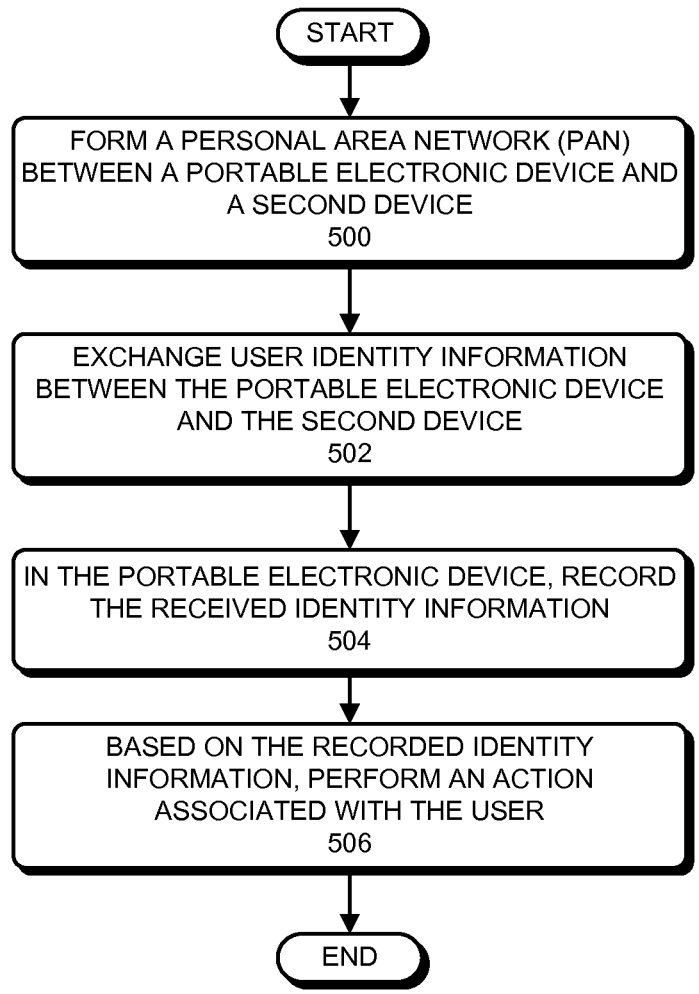
FIG. 5 presents a flowchart illustrating a process for performing an action based on the formation of a PAN with another device in accordance with the described embodiments.

FIG. 5 presents a flowchart illustrating a process for performing an action based on the formation of a PAN with another electronic device in accordance with the described embodiments. For the example shown in FIG. 5, we assume a portable electronic device (e.g., a laptop, a smart phone, etc.) including system 100 that forms ad hoc PANs with other similarly-equipped electronic devices. In addition, we assume a portable electronic device that can be configured to exchange selected information about the identity of the user of the portable electronic device and the identity of the user for other devices with which the portable electronic device forms PANs.

As shown in FIG. 5, the process starts when the portable electronic device forms a PAN with another similarly-equipped electronic device (step 500). For example, a smart phone can form a PAN with a second smart phone, a kiosk in the mall, a laptop or desktop computer, a security system, etc. In these embodiments, the PAN can be formed by networking subsystem 106 using techniques known in the art.

Upon detecting that the PAN has been formed, networking subsystem 106 forwards a notification to processing subsystem 102. Processing subsystem 102 then retrieves identity information from the other electronic device (step 502). For example, one or both devices can be smart phones that are configured to provide selected user identity information to devices with which PANs are formed. In these embodiments, when the PAN is formed, a processing subsystem 102 in each device can cause the devices to exchange the user identity information with one another (or can cause the electronic device to receive identity information from the other device without sending identity information to the other device). Processing subsystem 102 then records the identity information from the other device (step 504).

Processing subsystem 102 then determines if the user is a user for which an action is associated or for which processing subsystem 102 is configured to perform an action. For example, processing subsystem 102 can be configured to alert the user to the presence of the other person, turn down music when someone is at the door, exchange files intended for that person, or perform another operation. If so, based on the recorded identity information, processing subsystem 102 performs the action associated with the user (step 506).

In some embodiments, system 100 performs one or more actions immediately upon receiving the notification of the change in status of the network connection from networking subsystem 106. For example, assume that system 100 is in a location-aware cellular phone that includes a service (e.g., an application) for determining street traffic levels. In this embodiment, a Bluetooth™ network connection to a user's car can be determined to have been made by system 100 (using a network for the car, a time of coupling, etc.). System 100 can then immediately perform the action of checking a volume of traffic on a predetermined route (e.g., to work) to determine if an alarm should be signaled to the user to enable the user to take an alternate route due to heavy traffic on the route.

In some embodiments, system 100 performs one or more actions a predetermined time after receiving the notification of the change in status of the network connection from networking subsystem 106. In some of these embodiments, the information can be recorded immediately, but the action can be performed later.

For example, assume that the system 100 is in a laptop computer that the user typically disconnects from a first wireless network at home and wirelessly connects to a second wireless network at work 30 minutes later. In this embodiment, system 100 can detect the disconnect event from the home wireless network then and perform a check for a connection to the work wireless network 30 minutes later. If a connection to the work network is not made by the time the check occurs, system 100 can perform actions such as enabling a predetermined locking sequence (e.g., setting a predetermined password), securing sensitive data, locking hard drives, and/or disabling or otherwise limiting system capabilities. As another example, assuming the same laptop, system 100 can periodically check to see if a connection to, or a disconnection from, a given network has occurred in a predetermined amount of time (e.g., 1 hour, 1 day, 1 week, etc.). If not, one or more associated actions can be performed.

Figure 6:
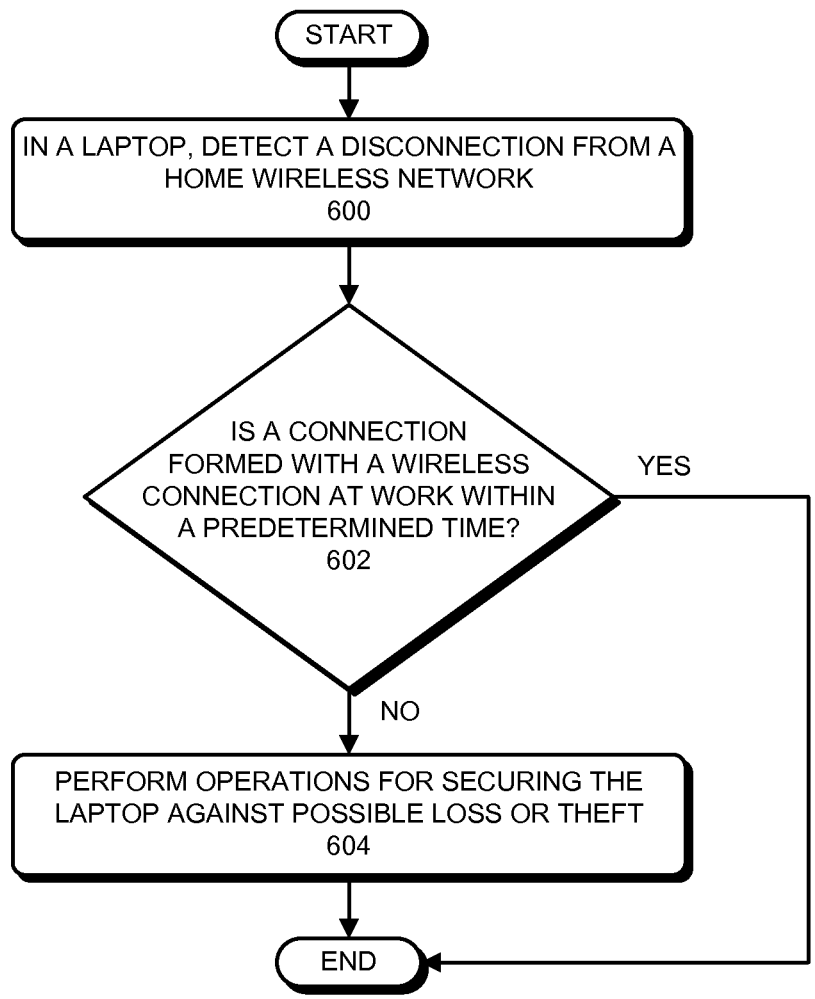
FIG. 6 presents a flowchart illustrating a process for performing an action a predetermined time after a disconnection from a network in accordance with the described embodiments.

FIG. 6 presents a flowchart illustrating a process for performing an action a predetermined time after a disconnection from a network in accordance with the described embodiments. For the example shown in FIG. 6, we assume a laptop computer that includes a system 100 that can be configured to form wireless (e.g., IEEE 802.11 or Bluetooth™) network connections with wireless networks in a home and at work.

As shown in FIG. 6, the process starts when the laptop computer is disconnected from a home wireless network (step 600). In some embodiments, networking subsystem 106 determines that a wireless connection to the home wireless connection has been lost and forwards a notification to processing subsystem 102.

A predetermined time after receiving the notification that the wireless connection was lost, processing subsystem 102 queries networking subsystem 106 to determine if a wireless network connection has been formed with a wireless network at work (step 602). For example, processing subsystem 102 can be configured to make the connectivity query to networking subsystem 106 one week later, one day later, one hour later, or a different time later. (Note that in these embodiments, the laptop computer detects a disconnection event for the home wireless network, but does not perform the resulting action of checking for the connection to the work wireless network until the predetermined time later.)

If networking subsystem 106 returns an affirmation that the wireless connection has been formed with the wireless network at work, the process is complete. Otherwise, if networking subsystem 106 indicates that the wireless connection has not been formed with the wireless network at work, processing subsystem can perform one or more operations for securing the computer against possible theft or loss (step 604). For example, in these embodiments, processing subsystem 102 can secure hard drives, I/O devices (e.g., monitor, mouse, or keyboard), the operating system, or selected programs using a predetermined password or a physical key, can encrypt, conceal, or destroy sensitive data, can send an email/text message/instant message to inform security personnel or the user that the laptop may be stolen or lost, and/or can perform another action. Alternatively, processing subsystem 102 can alert the user that these operations will be performed unless a particular password is entered and/or unless the laptop is connected to one of the wireless systems before a certain time has passed.

Note that although we refer to particular networks in these examples, alternative embodiments use different types of networks. For example, some embodiments use Ethernet networks or other wired or wireless networks.

In addition to performing the action a predetermined time later in these embodiments, in some embodiments, system 100 can perform one or more actions immediately upon receiving a notification of a change in network status and can then perform one or more additional actions a predetermined time after receiving the notification.

In some embodiments, upon detecting a connection to a given network, system 100 can perform actions using or in combination with another device that is coupled to the network. For example, assuming that a home wireless system is coupled to a system that controls a heating system in the home, upon determining that a connection has been established with the home wireless network, system 100 can query the system that controls the heating system to find out a temperature of the home. If the temperature falls outside a preferred range, system 100 can prompt a user to activate the heating system, or can automatically activate the heating system.

In some embodiments, the above-described network connection status change detection and performance of actions is achieved using functional blocks in one or more of the subsystems in system 100. In other words, the status change can be detected and the actions can be performed by hardware blocks, circuits, and/or elements. In these embodiments, system 100 does not interact with an operating system or applications that may be running on processing subsystem 102 when performing the action(s). In some of these embodiments, errors in the operating system and/or applications (including maliciously generated errors) do not prevent the action from being taken.

Note that although we describe a number of network status changes, information that is recorded in response, and actions to be taken by a given electronic device, persons of skill in the art can use the herein described principles with different network status changes, information recorded in response, and actions taken without departing from the spirit of the disclosed embodiments.

Configuring Actions

In some embodiments, a user can manually configure system 100 to perform a given action when a predetermined network change in status occurs. For example, assuming that system 100 is used in a location-aware netbook, a user can configure system 100 so that when a Bluetooth™ network connection is lost at a given time and/or location, or when a connection to a given network is established or lost, system 100 awakes from a low-power state, records a current location, makes selected personal contact information available to other devices via the network, opens a number of user applications (email, remote login, etc.), and/or performs one or more other actions.

In some embodiments, system 100 can dynamically configure actions to be performed based on changes in network status. In these embodiments, system 100 can record user behavior or other operations associated with changes in network status and can use the recorded behavior or operations to determine actions to be performed when a similar change occurs in the future. In some of these embodiments, system 100 can configure the actions automatically. In other embodiments, system 100 can prompt a user to configure the actions.

For example, upon detecting disconnection from a wireless network or from a hard-wired connection, system 100 can record an internal and external state of system 100, and can record actions taken by a user using system 100 for a predetermined time. For example, upon disconnecting from a Bluetooth™ network connection, system 100 can determine a current time, a temperature, a set of applications accessed by the user on system 100, a location of system 100, and other internal or external states for the system 100. System 100 can then analyze the recorded user behavior to determine actions to be taken if the same change in the network status occurs in the future.

For example, assuming that system 100 is used in a cellular phone, system 100 can determine that a user in a particular location always sets a ringer volume to a higher level and/or silences the ringer upon disconnecting from a Bluetooth™ network in his or her car at location A (e.g., work) at 8:00 AM each morning. Based on this determination, system 100 can configure an action to occur each time the same network change in status occurs.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a computing device, comprising:
    detecting a change in a status of a network connection for the computing device, wherein the network connection is between the computing device and a car, and wherein the change in the status of the network connection occurs when the car is one of parked or turned off;
    based on the change in status of the network connection, determining a physical location of the computing device; and
    recording the physical location in a map application operating on the computing device, the recorded physical location representing the physical location of the computing device when the change of the status of the network connection occurred, the recording comprising saying, in the map application, a location indicator showing the physical location of the car.

2. The method of claim 1, wherein detecting the change in the status of the network connection comprises detecting one of:

a loss of a connection to a wired or wireless network;
a decrease in a signal strength of a connection to a wired or wireless network; or
an inability to communicate with another device using the network connection.

3. The method of claim 1, wherein determining the physical location of the computing device comprises:
requesting information about the physical location of the computing device from one or more subsystems in the computing device; and
determining the physical location of the computing device based on information returned from the one or more subsystems.

4. The method of claim 3, wherein the one or more subsystems comprise at least one location-sensing system.

5. The method of claim 1, wherein recording the physical location in the map application operating on the computing device comprises:
saving a pin for the map application, the saved pin comprising information indicating the physical location on a map.

6. The method of claim 1, further comprising:
upon receiving a request to display location information, displaying an indicator of the recorded physical location in an interface for the map application on a display of the computing device.

7. A non-transitory computer-readable storage medium storing instructions that, when executed by a computing device, cause the computing device to perform a method, the method comprising:
detecting a change in a status of a network connection for the computing device, wherein the network connection is between the computing device and a car, and wherein the change in the status of the network connection occurs when the car is one of parked or turned off;
based on the change in status of the network connection, determining a physical location of the computing device; and
recording the physical location in a map application operating on the computing device, the recorded physical location representing the physical location of the computing device when the change of the status of the network connection occurred, the recording comprising saving, in the map application, a location indicator showing the physical location of the car.

8. The computer-readable storage medium of claim 7, wherein detecting the change in the status of the network connection comprises detecting one of:
a loss of a connection to a wired or wireless network;
a decrease in a signal strength of a connection to a wired or wireless network; or
an inability to communicate with another device using the network connection.

9. The computer-readable storage medium of claim 7, wherein determining the physical location of the computing device comprises:
requesting information about the physical location of the computing device from one or more subsystems in the computing device; and
determining the physical location of the computing device based on information returned from the one or more subsystems.

10. The computer-readable storage medium of claim 9, wherein the one or more subsystems comprise at least one location-sensing system.

11. The computer-readable storage medium of claim 7, wherein recording the physical location in the map application operating on the computing device comprises:
saving a pin for the map application, the saved pin comprising information indicating the physical location on a map.

12. The computer-readable storage medium of claim 7, further comprising:
upon receiving a request to display location information, displaying an indicator of the recorded physical location in an interface for the map application on a display of the computing device.

13. A computing device, comprising:
a processing subsystem;
a networking subsystem;
wherein the networking subsystem performs operations for:
detecting a change in a status of a network connection for the computing device, wherein the network connection is between the computing device and a car, and wherein the change in the status of the network connection occurs when the car is one of parked or turned off;
wherein the processing subsystem performs operations for:
based on the change in status of the network connection, determining a physical location of the computing device; and
recording the physical location in a map application operating on the computing device, the recorded physical location representing the physical location of the computing device when the change of the status of the network connection occurred, the recording comprising saving, in the map application, a location indicator showing the physical location of the car.

14. The computing device of claim 13, wherein, when detecting the change in the status of the network connection, the networking subsystem detects one of:
a loss of a connection to a wired or wireless network;
a decrease in a signal strength of a connection to a wired or wireless network; or
an inability to communicate with another device using the network connection.

15. The computing device of claim 13, wherein determining the physical location of the computing device comprises:
requesting information about the physical location of the computing device from one or more subsystems in the computing device; and
determining the physical location of the computing device based on information returned from the one or more subsystems.

16. The computing device of claim 13, wherein recording the physical location in the map application operating on the computing device comprises:
saving a pin for the map application, the saved pin comprising information indicating the physical location on a map.

17. The computing device of claim 13, further comprising:
upon receiving a request to display location information, displaying an indicator of the recorded physical location in an interface for the map application on a display of the computing device.

* * * * *